Figures 1, 2:
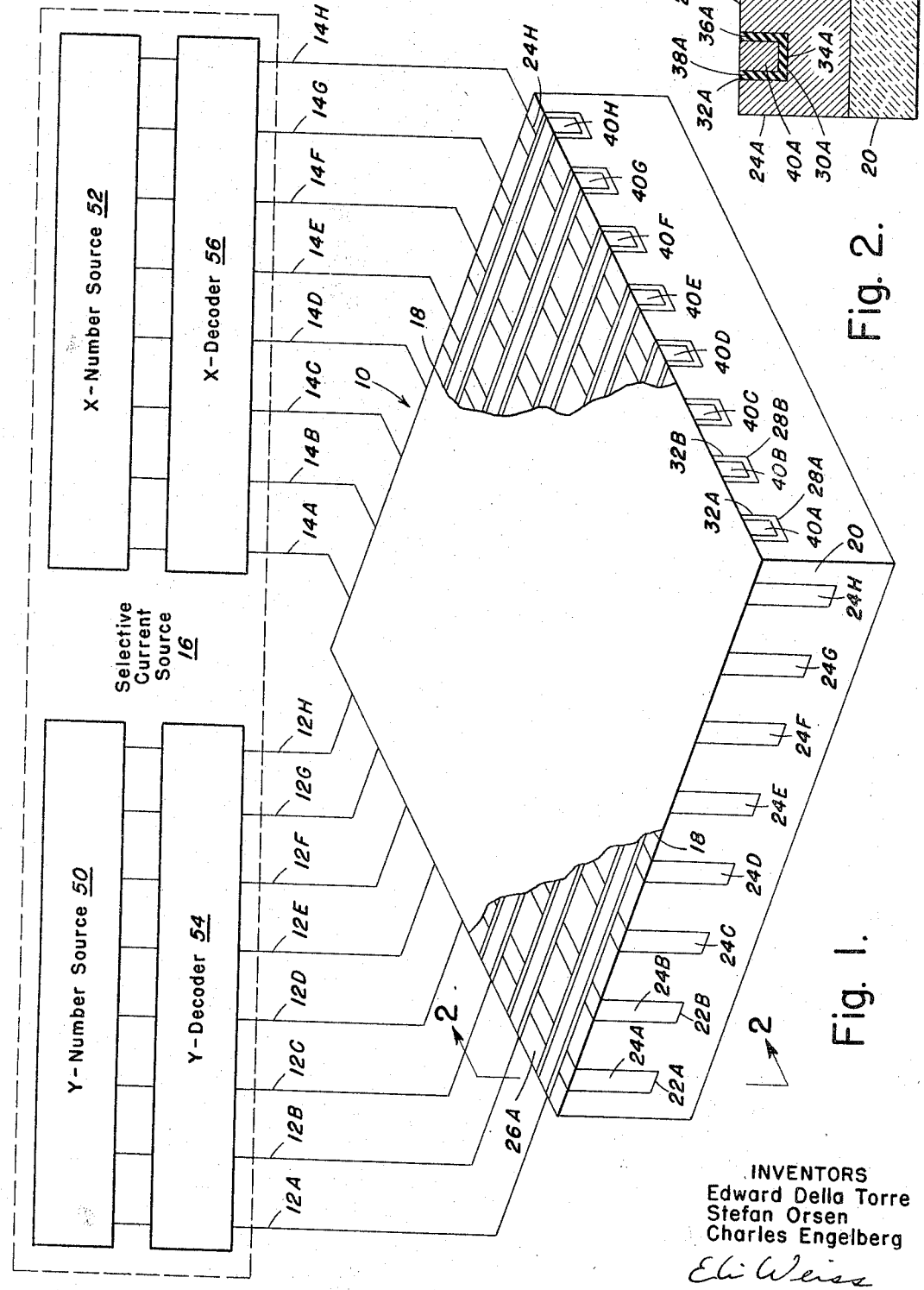

INVENTORS
Edward Della Torre
Stefan Orsen
Charles Engelberg
ATTORNEY

United States Patent Office 3,312,979
Patented Apr. 4, 1967

3,312,979
THERMAL RECORDING MATRIX
Edward Della Torre, Somerville, Stefan Orsen, Jersey City, and Charles Engelberg, Bound Brook, N.J., assignors to American Radiator & Standard Sanitary Corporation, New York, N.Y., a corporation of Delaware
Filed Feb. 23, 1965, Ser. No. 434,318
9 Claims. (Cl. 346—76)

This invention pertains to information recording apparatus and more particularly to the recording of information on a thermosensitive record medium.

In most data processing systems the results of the calculations are presented as visually readable information. The information can be in the form of alphanumeric symbols or in the form of curves. When the output information is in the form of curves, the data processor is often connected to what has become known as X–Y plotter. The information, if it is not in analog form, has to be converted to analog voltages that are fed to an electromechanical servo-system which drives an ink pen over a paper in accordance with the desired contour. Such plotters are complicated and use delicate mechanical systems of the analog type. Therefore, they are extremely vulnerable to dust, ambient conditions, and even the slightest abuse. Furthermore, because of the mechanical nature of the plotter, it is subject to wear, sticking of dirty bearings, and loss of alignment of parts. In order to maintain such plotters in top working order, it is necessary to treat them with extreme care and to perform periodic maintenance on them. Furthermore, because of the analog electrical servo-circuits employed, they have limited resolution and limited frequency response. In addition, because of the complex nature of the mechanical elements, the devices are slow operating due to inertia and friction. Finally, these devices generally employ ink pen recording elements and therefore, the record medium is not immediately usable since time must elapse to allow the ink to dry.

Therefore, it is a general object of the invention to provide an improved indicia recorder.

Another general object of the invention is to provide improved apparatus for recording indicia on a thermosensitive record medium.

It is another object of the invention to provide an improved chart recorder which is highly reliable and fast operating.

It is another object of the invention to provide an improved X–Y plotter which has no moving parts.

It is a further object of the invention to provide an improved X–Y plotter which is extremely rugged and relatively inexpensive.

It is a still further object of the invention to provide an improved X–Y plotter which requires the absolute minimum of maintenance.

It is yet a still further object of the invention to provide an improved X–Y plotter of fine resolution and high immunity to ambient conditions.

Broadly, the invention contemplates apparatus for recording a spot on a thermosensitive record medium. The apparatus comprises a first electrical conductor which is at least partially surrounded by an electrical resistance means. The electrical resistance means is in intimate electrical contact with the first electrical conductor. A second electrical conductor is also in intimate electrical contact with the electrical resistance means but spaced from said first electrical conductor. Therefore, when a source of current is connected to the conductors, current flows in a path which includes a portion of the electrical resistance means. That portion, accordingly, heats. If the thermosensitive record medium is placed against the portion which heats the medium will change color and a spot will be recorded.

In a more detailed aspect of the invention, the apparatus for recording a single spot is multiplied in a regular geometric manner so that a plurality of spots may be recorded to represent a curve.

Other objects, and the features and advantages of the invention will be apparent from the following detailed description when read together with the accompanying drawings, which show, by way of example and not limitation, the now preferred embodiment of information recording apparatus in accordance with the invention.

In the drawings:

FIG. 1 is a perspective view, partially employing blocks, of information recording apparatus which may be used as an X–Y plotter with part of a top layer of electrically conductive material broken away; and FIG. 2 is a sectional view taken along the line 2—2 of FIG. 1.

Referring to FIG. 1, the system includes a recorder 10 which receives current via lines 12 and 14 from a selective current source 16. When current flows through the lines 12 and 14 certain areas of the recorder become hot. The areas which generate heat are determined by which of those lines 12 and 14 are passing current. When a thermosensitive paper is placed on the top face of recorder 10, the regions of the paper which are opposite the heated areas of the recorder change color.

The various elements of the system will now be described. The recorder 10 comprises a plate 20 of insulating material such as a ceramic. Cut into the top face of plate 20 are a first plurality of parallel grooves 22. Grooves 22 are separated from each other and preferably mutually parallel. Fitted into each one of the grooves 22 is a first electrical conductor 24. Electrical conductors 24 are preferably of metal such as copper, silver, gold or aluminum. The top surface of electrical conductors 24 extend to the top face of plate 20 and are flush therewith as is apparent from FIG. 2. Cut into the top face of plate 20 is a second plurality of grooves 28. Grooves 28 are spaced from each other and, preferably, mutually parallel. Grooves 28 intersect grooves 22. Furthermore, there are notches, such as notch 30A (FIG. 2), in each of the conductors 24 wherever conductors 24 intersect the grooves 28. Therefore, as viewed in FIG. 1, there are a plurality of continuous horizontal grooves in the top face of recorder 10. Fitted into each of the grooves 28 is a channel-like electrical insulating element 32 made of sodium silicate, for example. Each element 32 has a base 34 and two upwardly extending side walls 36 and 38. Fitted into each of the channels of the electrical insulating elements 32 is an electrical conductor 40 of a metal such as copper, silver, gold or aluminum. Conductors 40 extend upwardly to be flush with the top face of the plate 20. The top face of plate 20 is uniformly covered with a thin layer 18 of electrically resistive material such as graphite.

The selective current source 16 feeds current via leads 14 and 12 to the conductors 24 and 40. These conductors will receive current in accordance with the points to be plotted. Generally, a point comprises an X-coordinate and a Y-coordinate. The Y-number source 50 supplies the Y-coordinate and the X-number source 52 supplies the X-coordinate. If these coordinates are generated by a digital computer, they are most likely in the form of binary-coded numbers. Therefore, it is necessary to convert the binary-coded numbers to voltages on one of a plurality of lines. The Y-decoder 54 performs the conversion for the Y-number source 50, and the X-decoder 56 performs a similar function for the X-number source 52. The decoders are similar, except that the Y-decoder 54 generates voltages of a first polarity whereas the X-decoder 56 generates voltages of the opposite polarity. Therefore, the Y-decoder 54 transmits a positive current to one of the lines 12 while the X-decoder 56 receives the positive current from one of the lines 14.

Assume that during operation, the Y-decoder 54 energizes the line 12A and the X-decoder 56 energizes the line 14A. Therefore, current will flow from Y-decoder 54 via line 12A to conductor 40A. The current will flow across portions of the electrically resistive layer 18 that span the conductors 40A and 24A to the conductor 24A, and return via the line 14A to the X-decoder 56. As current flows across the portions of the layer 18, the conductor 40A and the conductor 24A, these portions heat due to the normal Joule effect. This heating can generate a spot on the area of a thermosensitive record medium that is placed atop the recorder 10 which is opposite the heated portions.

Hence, it should be apparent that by sequentially feeding Y-coordinates and X-coordinates to the Y-decoder 54 and the X-decoder 56, it is possible to plot a whole series of points. Of course, by minimizing the spacing between the grooves and the widths of the conductors and resistance elements, the series of points will merge into a continuous curve. Furthermore, it should be realized that, by appropriate feeding of Y-coordinates to their respective decoders, it is possible to simultaneously trace out a plurality of curves on a single thermosensitive record medium.

It should be noted that a similar but possibly slower acting recorder can be provided by making the channel-like elements 32 of an electrically resistive material such as graphite and deleting the layer 18 from the top face of plate 20. Of course, such elements 32 should be in good material contact with the conductors 24 and 40. In such a case, Joule heating will occur in the portions of the side walls of the elements 32 that abut the conductors 24 and 40 in the regions of the intersection of the grooves 22 and 28.

There has thus been shown an improved indicia recorder which, by utilizing electrical resistances at the intersections of electrical conductors which are fed by current sources, can reliably and rapidly record information such as that represented on a typical X–Y plotter. Furthermore, by providing a combination of electrical conductors embedded in an insulating block and connected by a layer of electrically resistive material there is obtained indicia recording apparatus which has no moving parts and requires a minimum maintenance.

While only one embodiment of the invention has been shown and described in detail there will now be obvious to those skilled in the art many modifications and variations satisfying many or all of the objects of the invention but which do not depart from the spirit thereof as defined in the appended claims.

What is claimed is:

1. Apparatus for recording a spot on a thermosensitive record medium comprising a first electrical conductor, an electrical resistance means surrounding at least a portion of said first electrical conductor and in intimate electrical contact therewith, said electrical resistance means being adapted to be positioned against said thermosensitive record medium, a second electrical conductor intersecting said first electrical conductor and spaced from said first electrical conductor, said second conductor being in intimate electrical contact with said electrical resistance means, and means for applying a source of electric current to said first and second conductors so that electric current flows from said first conductor via said electrical resistance means to said second conductor whereby the portion of said electrical resistance means in the electric current flow path is heated by said current flow.

2. Apparatus for recording a spot on a thermosensitive record medium comprising a plate of insulating material including a face portion, said plate being provided with first and second intersecting grooves in said face portion, a first electrical conductor, an electrical insulating means surrounding at least a portion of said first electrical conductor, a second electrical conductor in the first of said grooves, said first electrical conductor and said electrical insulating means positioned in said second groove with said electrical insulating means insulating said first electrical conductor from said second electrical conductor in the region of intersection of said grooves, and a layer of electrically resistive material on said face portion and covering said electrical conductors so that an electrical resistance path is provided between said conductors on the face portion of said plate.

3. Apparatus for recording a spot on a thermosensitive record medium including a plate of insulating material including a face portion, said plate being provided with first and second intersecting grooves in said face portion, a first electrical conductor in one of said grooves, a second electrical conductor, an electrical insulating means surrounding at least a portion of said second electrical conductor, said second electrical insulating means being in said second groove with said electrical insulating means electrically insulating said second conductor from said first conductor, a layer of electrically resistive material on said face portion and covering said electrical conductors so that an electrical resistance path is provided between said conductors on the face portion of said plate, and means for applying a source of electric current to said first and second conductors so that electric current flows from said first conductor via said layer of electrically resistive material to said second conductor whereby the portion of said layer in the electric current flow path heats, and said plate is adapted to be positioned against said thermosensitive record medium.

4. Apparatus for recording a plurality of spots on a thermosensitive record medium comprising a plurality of first electrical conductors, a plurality of second electrical conductors intersecting and spaced from said plurality of first electrical conductors, and a plurality of electrical resistances for generating heat, said plurality of electrical resistance areas disposed in a plane, each of said electrical resistance areas being connected to one of said first electrical conductors and to one of said second electrical conductors, so that each electrical resistance area is in a unique electrical conduction path including one of said first electrical conductors and one of said second electrical conductors so that, when the thermosensitive record medium is positioned opposite the plane of said electrical resistance areas, spots are recorded on the portions of the thermosensitive record medium opposite the electrical resistance areas that are generating heat.

5. Apparatus for recording a plurality of spots on a thermosensitive record medium comprising a plurality of first electrical conductors, a plurality of second electrical conductors intersecting and spaced from said plurality of first electrical conductors, a plurality of electrical resistance areas for generating heat, said plurality of electrical resistance areas being disposed in a plane, each of said electrical resistance areas being connected to one of said first electrical conductors and to one of said second electrical conductors, so that each electrical resistance area is in a unique electrical conduction path including one of said first electrical conductors and one of said second electrical conductors, and means for selectively connecting electric current source to combinations of electrical conductors from said plurality of first electrical conductors and electrical conductors from said plurality of second electrical conductors so that certain of said electrical resistance areas heat so that, when the thermosensitive record medium is positioned opposite the plane of said electrical resistance areas, spots are recorded on the portions of the thermosensitive record medium opposite the electrical resistance areas that are generating heat.

6. Apparatus for recording a plurality of spots on a thermosensitive record medium comprising a flat plate of electrically insulating material including at least a top face portion, said top face portion being provided with a first plurality of substantially parallel grooves and a second plurality of substantially parallel grooves, said first plurality of grooves intersecting said second plurality of grooves, a plurality of first electrical conductors, each of said first electrical conductors being in one of the grooves of said first plurality of grooves, a plurality of second electrical conductors, and a plurality of electrical insulating elements, each of said electrical insulating elements at least partially surrounding one of said second electrical conductors, each of said electrical insulating elements and its associated second electrical conductor being in one of the grooves of said second plurality of grooves with the electrical insulating element insulating the second electrical conductor from the first electrical conductor in each of the grooves of the first plurality of grooves intersected by said one of the grooves of said second plurality of grooves, a layer of electrically resistive material on said face portion and covering said electrical conductors so that an electrical resistive path is provided between said conductors on the face portion of said plate, and the top face portion of said flat plate being adapted to be positioned against the thermosensitive record medium.

7. Apparatus for recording a plurality of spots on a thermosensitive record medium comprising a flat plate of electrically insulating material including at least a top face portion, said top face portion being provided with a first plurality of substantially parallel grooves and a second plurality of substantially parallel grooves, said first plurality of grooves intersecting said second plurality of grooves, a plurality of first electrical conductors, each of said first electrical conductors being in one of the grooves of said first plurality of grooves, a plurality of second electrical conductors, a plurality of electrical insulating elements for generating heat, each of said electrical insulating elements at least partially surrounding one of said second electrical conductors, each of said electrical insulating elements and its associated second electrical conductor being in one of the grooves of said second plurality of grooves with the electrical insulating element electrically insulating the associated second electrical conductor from the first electrical conductor in each of the grooves of said second plurality of grooves, a layer of electrically resistive material on said face portion and covering said electrical conductors so that an electrical resistance path is provided between said conductors on the face portion of said plate, and means for selectively connecting electric current sources to combinations of electrical conductors from said plurality of first electrical conductors and electrical conductors from said plurality of second electrical conductors to cause portions of said layer to generate heat so that when the thermosensitive record medium is positioned against said layer spots are recorded on the portions of the record medium that are opposite the portions of said layer that generate heat.

8. Apparatus for recording a plurality of spots on a thermosensitive record medium comprising a flat plate of electrically insulating material including at least a top face portion, said top face portion being provided with a first plurality of substantially parallel grooves and a second plurality of substantially parallel grooves, said first plurality of grooves intersecting said second plurality of grooves, a plurality of first electrical conductors, each of said first electrical conductors being in one of the grooves of said first plurality of grooves, each of said first electrical conductors being provided with notches that align with the intersecting grooves of said second plurality, the regions of said first conductors remote from said notches completely filling the associated groove and being flush with the top face portion of said flat plate, a plurality of channel-like electrical insulating elements having a base and side walls extending from said base, each of said electrical insulating elements being in one of the grooves of said second plurality of grooves with the side walls and base of the electrical insulating element abutting the first electrical conductors, at their notch regions, in the grooves of said first plurality of grooves which are intersected by said one of the grooves of said second plurality of grooves, the side walls of said electrical insulating elements extending to and being flush with the top face portion of said flat plate, a plurality of second electrical conductors, each of said second electrical conductors being in the channel of one of the channel-like electrical insulating elements and extending to be flush with the top face portion of said flat plate, and a layer of electrically resistive material on said top face portion and covering said electrical conductors so that an electrical resistance path is provided between said conductors on the top face portion of said plate.

9. Apparatus for recording a plurality of spots on a thermosensitive record medium comprising a flat plate of electrically insulating material including at least a top face portion, said top face portion being provided with a first plurality of substantially parallel grooves and a second plurality of substantially parallel grooves, said first plurality of grooves intersecting said second plurality of grooves, a plurality of first electrical conductors, each of said first electrical conductors being in one of the grooves of said first plurality of grooves, each of said first electrical conductors being provided with notches that align with the intersecting grooves of said second plurality, the regions of said first conductors remote from said notches completely filling the associated groove and being flush with the top face portion of said flat plate, a plurality of channel-like electrical insulating elements having a base and side walls extending from said base, each of said channel-like electrical insulating elements being in one of the grooves of said second plurality of grooves with the side walls and base of said channel-like electrical insulating element abutting the first electrical conductors, at their notch regions, in the grooves of said first plurality of grooves which are intersected by said one of the grooves of said second plurality of grooves, the side walls of said channel-like electrical insulating elements extending to and being flush with the top face portion of said flat plate, a plurality of second electrical conductors, each of said second electrical conductors being in the channel of one of the channel-like electrical insulating elements and extending to be flush with the top face portion of said flat plate, a layer of electrically resistive material on said top face portion and covering said electrical conductors so that an electrical resistance path is provided between said conductors on the top face portion of said plate, and means for selectively connecting electric current sources to combinations of electrical conductors from said plurality of first electrical conductors and electrical conductors from said plurality of second electrical conductors so that portions of said layer spanning the first and second conductors connected to the electric current sources heat.

References Cited by the Examiner
UNITED STATES PATENTS

| | | | |
|---|---|---|---|
| 1,810,692 | 6/1931 | Wald. | |
| 2,922,688 | 1/1960 | Boyan | 346—76 |
| 3,161,457 | 12/1964 | Schroeder et al. | 346—76 |
| 3,173,745 | 3/1965 | Stone et al. | 346—107 |
| 3,219,993 | 11/1965 | Schwertz | 346—76 X |

RICHARD B. WILKINSON, *Primary Examiner.*

J. W. HARTARY, *Assistant Examiner.*